UNITED STATES PATENT OFFICE 2,551,767

MIXED ESTERS

Leon Shechter, East Orange, and Allison S. Burhans, Montclair, N. J., assignors, by mesne assignments, to Union Carbide and Carbon Corporation, a corporation of New York No Drawing. Application August 17, 1946, Serial No. 691,395

16 Claims. (Cl. 260—485)

The invention herein disclosed relates to mixed esters of mono- and dibasic acids prepared by reaction with polyhydric alcohols to form resinous products. It is directed to those esters in which the mono-acid is a diene type of acid of which sorbic acid is representative. The modification of such esters by the inclusion as a reactant of a dibasic acid as hereinafter disclosed has been found to impart unexpected and desirable properties to the esters, and particularly to laminates bonded by the esters.

The diene mono-acids of this invention are acids having ethylenic bonds in conjugation and one of these in conjugation with the acid carbonyl group; they comprise those having a straight chain skeletal structure

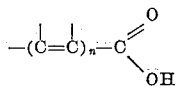

wherein $n$ is preferably 2 to 4, and those having a cross-conjugate chain skeletal structure

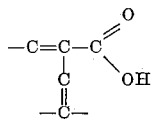

wherein the indicated free valencies are satisfied by hydrogen, alkyl, alkenyl or aryl groups. In addition to sorbic acid, straight chain acids of primary interest include β-vinyl-acrylic, octatrien-(2,4,6)-oic, decatetraen-(2,4,6,8)-oic, and β-styryl-acrylic; but α-methyl-sorbic, α-ethyl-sorbic, γ-ε-dimethyl-sorbic, β-δ-dimethyl-sorbic, α-methyl-γ-benzal-crotonic, α-ethyl-δ-phenyl-α-γ-butadiene-α-carboxylic, 2,6-dimethyl-decatrien-(2,6,8)-oic-(10), etc., likewise form esters as herein disclosed. Examples of the cross-conjugate acids are α-β-diisopropylidene-propionic, α-vinyl-cinnamic, α-isopropenyl-cinnamic, α-isopropenyl-furfural-acetic, and α-isopropenyl-cinnamenyl-acrylic acids.

Polyhydric alcohols for reaction with the acids or the intermediates include alkylene glycols and polyglycols, glycerols and polyglycerols, erythritol and pentaerythritol and their polymers, sorbitol, mannitol, trimethylol-propane, polyhydroxyethylbenzenes, etc. Usually the alcohol is added in excess of stoichiometric proportions.

The modifying dibasic acid, incorporated as a reactant to form a mixed ester in accordance with this invention, can be a dibasic acid of the saturated aliphatic and of the aromatic series, as for example: succinic, glutaric, adipic, sebacic, phthalic; and also dimeric sorbic, dimerized fatty acids, adducts of maleic acid, etc.; and their alkyl and aryl derivatives. Particularly useful for bonding laminates, however, are those acids in which the carbon atoms carrying the carboxyl groups are separated by two or more carbon atoms (i. e. four or more carbon atoms between the carboxyls), such as adipic and the higher paraffinic acids and their alkyl and aryl derivatives; these are acids that do not dehydrate to form anhydrides upon heating. In the preparation of the mixed esters the molar ratio of monoacid to diacid can vary from 1.5:0.75 to 2.9:0.05 when the ester is prepared by reaction with glycerol or a higher alcohol and yet display a noticeable modifying effect due to the inclusion of either acid; glycols permit still greater latitude in the acid ratios.

The preferred method for the preparation of the esters is that of direct reaction in a hydrocarbon solution in the presence of a strong acidic catalyst. The strength of an acid is indicated by the speed of the ester-forming reaction, and such acids in the order of decreased strength are perchloric, sulfuric, hydrochloric, nitric, etc. Of these, sulfuric acid is preferred for ease of handling, availability and high order of strength that promotes substantially complete esterification at temperatures below 170° C. and within a preferred temperature range of about 120° C. to 150° C. to avoid discoloration; temperatures below 170° C. minimize premature gelation that interferes with the esterification and is apt to occur, particularly when low percentages of the diacid are present. The sulfonic acids, such as benzene-sulfonic, toluene-sulfonic, etc. operate as strong acids, though not found to be equal to sulfuric acid within the preferred temperature ranges; electrophilic halides, such as boron chloride, aluminum chloride and particularly boron trifluoride are likewise useful as strong acidic catalysts. The catalyst, when sulfuric acid is used, is added in about 1.5 to 2 per cent concentration based on the weight of the reactants, though from 0.3 to 3.0 per cent can be employed with good effect; other acids are used in equivalent proportions in inverse ratio to their order of strength.

Solvents act as agents for controlling the temperature and the ester-forming reaction. The preferred solvents are the substantially water-insoluble volatile hydrocarbons that entrain and carry off water as it is formed, the solvent being condensed and returned to the system; in general these form azeotropic mixtures with water.

They include hydrocarbon thinners, such as benzene, toluene, xylene, etc., "Solvesso" and "Hexone," o-bromotoluene, di-isobutyl ketone, ethyl benzene, dichlorethyl ether, etc.; various solvent mixtures can be used as well. Preferably the solvent content is from about 5 to 25 per cent of the batch in order to have a fast esterification rate, but as much as 75 per cent can be present. After the solvent is removed by distillation, purification of the esters for the elimination of the unreacted acids and the catalyst can be accomplished by washing with dilute alkali or by treating with dry sodium carbonate and filtering.

Inhibitors of polymerization are helpful, though no inhibitor has been found that permits esterification to continue to completion in the absence of solvent control; inhibitors are further useful for improving the storage stability of the ester products. Sulfur has been found particularly efficient in amounts of from about 0.1 to 0.5 per cent based on the weight of reactants and especially when used in conjunction with sulfuric acid as the catalyst, but selenium, hydroquinone and other known inhibitors can be used.

The invention is illustrated but not limited by the following examples.

Example 1

| | |
|---|---|
| Sorbic acid | 140 gms. |
| Adipic acid | 45.6 gms. |
| Glycerol (98%) | 64.7 gms. |
| Toluene | 83.0 gms. (25% of batch) |
| Sulfuric acid (95.5%) | 3.7 gms. (1.5% on reactants) |
| In methanol | 18 gms. |

A reaction kettle, fitted with a carbon dioxide inlet, an agitator and a condenser provided with a water trap and a return for the condensed solvents was charged with the monoacid, diacid, alcohol and solvent; the mass was heated to reflux temperature of about 135°–140° C. under an atmosphere of carbon dioxide, whereupon the sulfuric acid in methanol was slowly dropped in. The refluxing was continued for 4 hours during which the condensed water was continuously removed and the toluene returned to the kettle; 83 grams of toluene were added, the mass was cooled and neutralized with 12 grams of dry sodium carbonate and the product was filtered. The solution had a non-volatile content of 72.2 per cent, and the acid number was 11.9. On a molar basis the ratio of sorbic acid to adipic was 2:0.5, and on a weight basis this indicated a mixed ester of which about 75 per cent was sorbic triglyceride.

A modification of the foregoing example was the inclusion of about 0.7 gram of sulfur as an inhibitor. This slowed the reaction so that the refluxing was continued for 17.5 hours to yield an esterification that was 91.9 per cent complete.

Example 2

| | |
|---|---|
| Sorbic acid | 224 gms. |
| Adipic acid | 146 gms. |
| Glycerol (98%) | 139 gms. |
| Toluene | 128 gms. (20% of batch) |
| Sulfuric acid (99.5%) | 10 gms. (2% on reactants) |
| In methanol | 30 gms. |

The mixture of acids and glycerol in toluene were taken to a reflux temperature under carbon dioxide and the catalyst in methanol was dropped in slowly; the refluxing at about 135°–140° C. was continued under agitation for about 5 hours with continuous separation and return of the solvent. The solution was cut with more solvent to about 45% non-volatile, neutralized with 40 grams of dry sodium carbonate and filtered. The acid number was 8. The molar ratio of sorbic acid to adipic acid was 2:1, and on a weight basis the sorbic triglyceride calculated about 60 per cent of the ester.

Example 3

| | |
|---|---|
| Sorbic acid | 136.6 gms. |
| Adipic acid | 130.0 gms. |
| Glycerol (98%) | 103.4 gms. |
| Toluene | 92 gms. (20% of batch) |
| Sulfuric acid (95.5%) | 5.55 gms. (1.5% on reactants) |
| In methanol | 16 gms. |

The ingredients were mixed as in the preceding example, reacted 3 hours and cut with toluene to 60 per cent non-volatile with further refluxing at about 135°–140° C. for one hour. The mass was then cut to 45 per cent solids, cooled, neutralized with 21 grams of sodium carbonate and filtered. The solution had a non-volatile content of 47.5 per cent and acid number of 6.3. On a molar basis the ratio of sorbic acid to adipic acid was 3:2 giving calculated equal weights of sorbic and adipic triglycerides.

Example 4

Modification with succinic acid as the dibasic acid is illustrated by the following:

| | |
|---|---|
| Sorbic acid | 224 gms. |
| Succinic acid | 59 gms. |
| Glycerol (98%) | 103.4 gms. |
| Toluene | 100 gms. (20% of batch) |
| Sulfuric acid (95.5%) | 3.8 gms. (1% on reactants) |
| In methanol | 16 gms. |

Upon mixing as before, refluxing to about 135°–140° C. for 4 hours cutting with 146 grams more of solvent, cooling, neutralizing with 12 grams sodium carbonate and filtering, a solution containing 56.3 per cent of the ester product was obtained with an acid number of 16.

Example 5

The foregoing Example 4 was repeated with the substitution of 74 grams of phthalic anhydride to yield upon refluxing for 3.5 hours and cutting with 200 grams of solvent, a solution containing 54.2 per cent of the mixed ester with an acid number of 17.2

Example 6

To illustrate, an ester modified by a dibasic acid in which the carbon atoms adjacent the carboxyl groups are separated by more than two carbon atoms, sebacic acid was selected.

| | |
|---|---|
| Sorbic acid | 168.0 gms. |
| Sebacic acid | 151.5 gms. |
| Glycerol (98%) | 103.4 gms. |
| Toluene | 108.0 gms. (17% of batch) |
| Sulfuric acid (95.5%) | 6.5 gms. (2% on reactants) |
| In methanol | 22.0 gms. |

Upon refluxing at about 135°–140° C. the mass for 5 hours, cutting with 261 grams of toluene, cooling, neutralizing with 25 grams of sodium carbonate and filtering, there remained a solution of the ester containing 60 per cent non-volatile; the acid number was 17.4.

Example 7

Substituted dibasic acids, such as the adducts of maleic acid obtained by the diene synthesis and particularly the cyclopentadiene adduct, are effective modifying agents and illustrated by the following:

Sorbic acid _____ 224 gms.
Cyclopentadiene-maleic
   adduct _____ 82 gms.
Glycerol (98%) _____ 103.4 gms.
Toluene _____ 100.0 gms. (20% of batch)
Sulfuric acid (95.5%) 4.0 gms. (1% on reactants)
In methanol _____ 15.0 gms.

Upon refluxing at about 135°–140° C. for 5 hours, cutting with more toluene to about 55 per cent non-volatile, cooling, neutralizing with sodium carbonate and filtering, a solution of a liquid mixed ester with an acid number of 15 was obtained.

In the foregoing examples, sorbic acid was selected as typical of the monoacids. Substitution in the reaction of equivalent molar proportions of the other diene monoacids gave similar useful ester products under the conditions described.

The dibasic acid-modified esters in film form cure rapidly in the presence of oxygen and heat to give hard, mar-proof, lustrous surfaces. They are surprisingly flexible or extensible, and, when used as surface coatings on laminated stock they are bendable about projecting corners without any signs of cracking or crazing. They have, however, a wide variety of other useful applications: blending agents for improving the hardness of alkyd resins, nitrocellulose lacquers, vinyl polymers and copolymers (styrene, vinyl chloride-vinyl acetate, vinyl butyral, etc.); in varnishes and oils to promote rapidity of drying and hardness; in wrinkle finishes; as furniture finishes; bonding agents for sandpaper; in emulsion form for cloth-sizing; etc.

What is claimed is:

1. Process of preparing a mixed ester of a low acid number useful for coatings which comprises directly reacting a polyhydric alcohol in at least stoichiometric proportions with (1) from 1.5 to 2.9 moles of a 2,4-diene-monocarboxylic acid and (2) from 0.75 to 0.05 mole of a dicarboxylic acid from a group consisting of saturated aliphatic acids, phthalic acid and the cyclopentadiene adduct of maleic acid at a refluxing temperature below 170° C. in the presence of a strong acidic catalyst in a concentration of from 0.3 to 3.0 per cent and from 5 to 25 per cent of a volatile organic solvent based on the weight of reactants.

2. Process according to claim 1 in which the alcohol reactant is glycerol.

3. Process according to claim 1 in which the monoacid reactant is sorbic acid.

4. Process according to claim 1 in which the diacid reactant is one having the carboxyl-carrying carbon atoms separated by a chain of at least two carbon atoms.

5. Process according to claim 1 in which the diacid reactant is adipic acid.

6. Process according to claim 1 in which the diacid reactant is sebasic acid.

7. Process according to claim 1 in which the catalyst is sulfuric acid.

8. Process according to claim 1 in which the solvent is toluene.

9. Process of preparing a mixed ester of a low acid number useful for coatings which comprises directly reacting glycerol in at least stoichiometric proportions with (1) from 1.5 to 2.9 moles of sorbic acid and (2) from 0.75 to 0.05 mole of adipic acid at a refluxing temperature below 170° C. in the presence of from 0.3 to 3.0 per cent of sulfuric acid and from 5 to 25 per cent of toluene based on the weight of the reactants.

10. Mixed ester of a low acid number useful for coatings comprising the direct reaction product of a polyhydric alcohol in at least stoichiometric proportions with (1) from 1.5 to 2.9 moles of a 2,4-diene-monocarboxylic acid and (2) from 0.75 to 0.05 mole of a dicarboxylic acid from the group consisting of saturated aliphatic acids, phthalic acid and the cyclopentadiene adduct of maleic acid.

11. Mixed ester according to claim 10 in which the alcohol reactant is glycerol.

12. Mixed ester according to claim 10 in which the monoacid reactant is sorbic acid.

13. Mixed ester according to claim 10 in which the diacid reactant is one having the carboxyl-carrying carbon atoms separated by a chain of at least two carbon atoms.

14. Mixed ester according to claim 10 in which the diacid reactant is adipic acid.

15. Mixed ester according to claim 10 in which the diacid reactant is sebacic acid.

16. Mixed ester comprising the direct reaction product of glycerol in at least stoichiometric proportions with from 1.5 to 2.9 moles of sorbic acid and from 0.75 to 0.05 mole of adipic acid.

LEON SHECHTER.
ALLISON S. BURHANS.

REFERENCES CITED

The following references are of record in the file of this patent:

UNITED STATES PATENTS

| Number | Name | Date |
|---|---|---|
| 1,975,246 | Zwilgmeyer | Oct. 2, 1934 |
| 2,010,426 | Burke | Aug. 6, 1935 |
| 2,106,703 | Cox | Feb. 1, 1938 |
| 2,195,362 | Ellis | Mar. 26, 1940 |
| 2,362,511 | Teeters | Nov. 14, 1944 |